No. 779,480. Patented January 10, 1905.

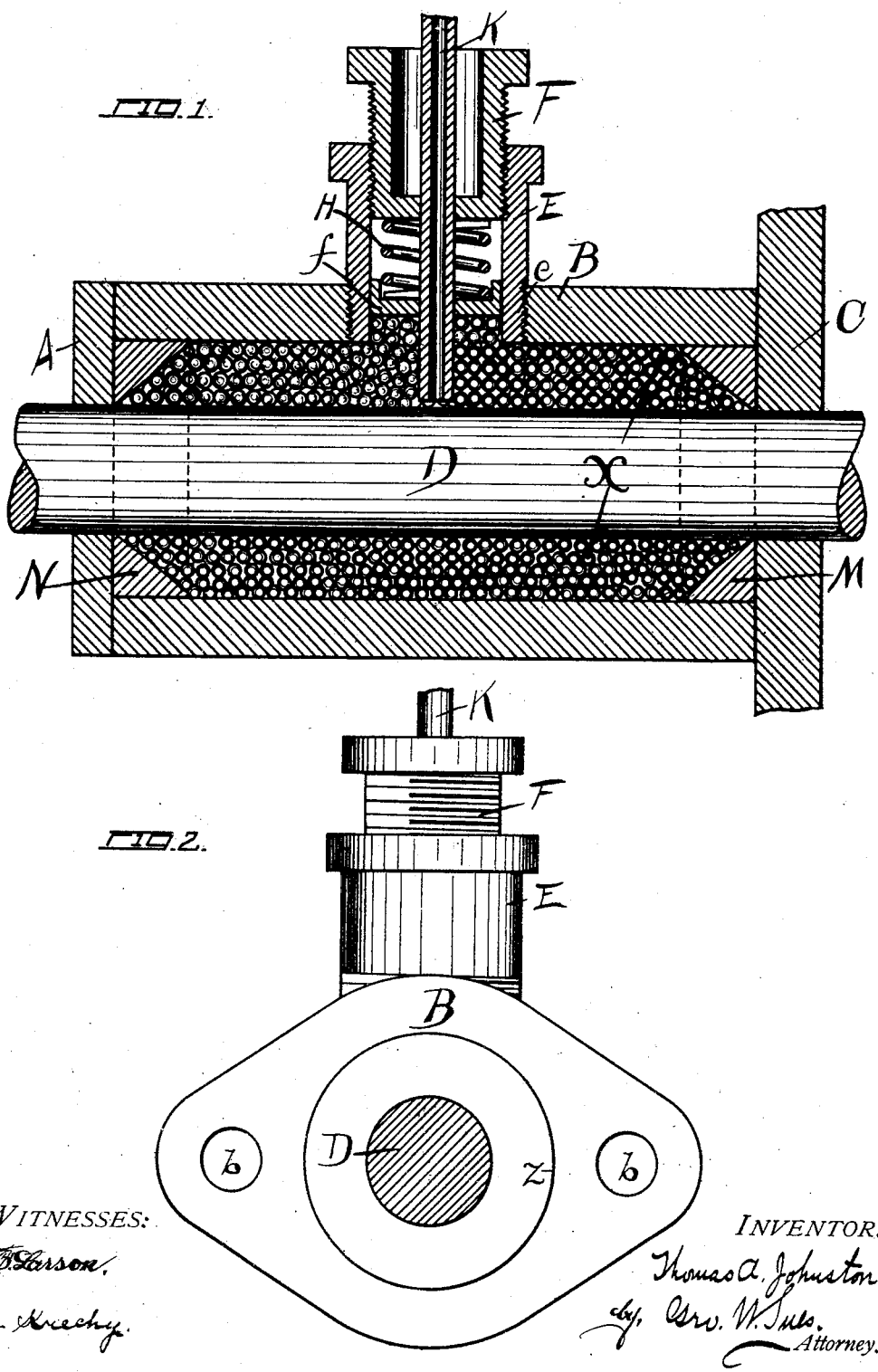

UNITED STATES PATENT OFFICE.

THOMAS A. JOHNSTON, OF CHADRON, NEBRASKA.

METALLIC PACKING.

SPECIFICATION forming part of Letters Patent No. 779,480, dated January 10, 1905.

Application filed May 18, 1903. Serial No. 157,747.

*To all whom it may concern:*

Be it known that I, THOMAS A. JOHNSTON, residing at Chadron, in the county of Dawes and State of Nebraska, have invented certain useful Improvements in Metallic Packing; and I do hereby declare that the following is a full, clear, and exact description of the invention, such as will enable others skilled in the art to which it appertains to make and use the same, reference being had to the accompanying drawings, which form a part of this specification.

This invention relates to a new and novel improvement in metallic packing.

The aim of my invention is to provide a metallic packing especially adapted to be used in connection with valve-stems and piston-rods, which is so constructed that the packing will be practically air and steam tight, though it is readily removable, is cheap, and may be almost instantly replaced.

In the accompanying drawings I have shown in Figure 1 a central sectional view of a stuffing-box provided with my metallic packing, while Fig. 2 shows a front view of my metallic packing as secured to a steam-chest.

In carrying out the aim of my invention I provide a suitable gland B of any improved construction, which is provided at suitable points with two openings $b$, as is shown in Fig. 2, and this gland is provided with a cylindrical opening $z$, as is shown in Fig. 2. This gland is provided with a head A, secured thereto by any suitable bolts or studs, which pass through the gland and under the front head C of a suitable steam-chest or other housing to which my metallic packing is to be secured.

In Fig. 1 I show a sectional view disclosing a broken portion of the valve-rod D of an ordinary cylinder, and this rod is provided with a steam-tight metallic packing by means of my invention. The gland B is provided with a suitable threaded opening $e$ above, adapted to receive the threaded collar E, as shown in Figs. 1 and 2. Threading into this collar E is the plug F, which plug is perforated and adapted to receive the oil-pipe K, as is disclosed in Fig. 1, which pipe enters the gland through the pressure-plug at a suitable point and is adapted to be held immediately adjacent the rod or yoke D to be lubricated, so that the oil fed into the gland will be deposited immediately upon the stem to be oiled. Held within the ends of this gland B are two cup-shaped rings M and N, the cup-shaped openings of which face one another. These rings fit freely upon the stem D. The chamber thus formed by means of the gland B and the two packing-rings M and N are filled with small shot or spheres $x$, made of suitable antifriction metal, such a Babbitt metal and the like, and these spheres at one point come in contact with the rod or other stem passing through the gland, and so form a plurality of very small chambers, and these chambers are then filled by means of a suitable lubricant, preferably mixed with graphite, which finds an entry through the pipe K and floods the entire gland.

It is found that the graphite and oil pack in between the spheres in such a manner as to insure practically a steam-tight connection. Now as the spheres come in contact with the moving stem or rod they are in time flattened; but in order to replace them it is simply necessary for the operator to remove the plate A, draw off the cup-ring N, when the entire contents of the gland may be easily removed. The packing is then carefully looked over, the worn spheres are replaced, when a new supply of spheres are again placed into the gland, which has been properly assembled. Now in order that the ball-packing may be properly retained in place and be prevented from jolting upward, which would be the case where my metallic packing is used in connection with locomotives, I provide a follower $f$, between which and the plug F is interposed the coil-spring H to securely hold this packing. The plug F is properly adjusted to give a suitable tension to the spring and may be secured by means of a lock-nut.

This metallic packing may be used in connection with any suitable stems or rod and may be made of various sizes.

Having thus described my said invention, what I claim as new, and desire to secure by United States Letters Patent, is—

1. In a metallic packing, the combination of a suitable housing, of an oil-feed pipe entering said housing through a suitable opening, a plurality of spheres and a spring-pressed follower surrounding said oil-pipe and pressing upon said spheres, all arranged substantially as and for the purpose set forth.

2. In a metallic packing, the combination with a suitable housing, of a plurality of spheres within said housing, a spring-pressed follower working against said sphere, and an oil-pipe entering said housing.

In testimony whereof I affix my signature in presence of two witnesses.

THOMAS A. JOHNSTON.

Witnesses:
M. KRECHY,
GEO. W. SUES.